(12) United States Patent
Kanbe

(10) Patent No.: US 7,262,901 B2
(45) Date of Patent: Aug. 28, 2007

(54) ELECTROPHORETIC DEVICE, METHOD OF MANUFACTURING THE SAME, AND ELECTRONIC APPARATUS

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/357,057

(22) Filed: Feb. 21, 2006

(65) Prior Publication Data

US 2006/0215253 A1    Sep. 28, 2006

(30) Foreign Application Priority Data

Mar. 28, 2005    (JP) .............................. 2005-092568

(51) Int. Cl.
*G02B 26/00*    (2006.01)
(52) U.S. Cl. ...................... 359/296; 359/259; 359/245; 430/32; 345/55; 345/107
(58) Field of Classification Search ................. 359/296
See application file for complete search history.

(56) References Cited

U.S. PATENT DOCUMENTS 5,402,145 A * 3/1995 Disanto et al. ............. 345/107

| | | | |
|---|---|---|---|
| 6,172,798 B1 * | 1/2001 | Albert et al. | 359/296 |
| 6,337,761 B1 * | 1/2002 | Rogers et al. | 359/296 |
| 6,545,797 B2 * | 4/2003 | Chen et al. | 359/296 |
| 2003/0011869 A1 * | 1/2003 | Matsuda et al. | 359/296 |
| 2005/0007651 A1 * | 1/2005 | Liang et al. | 359/296 |
| 2005/0104844 A1 * | 5/2005 | Nakai et al. | 345/107 |
| 2005/0231795 A1 * | 10/2005 | Martins et al. | 359/296 |

FOREIGN PATENT DOCUMENTS

JP    A 2003-295235    10/2003

* cited by examiner

*Primary Examiner*—Ricky Mack
*Assistant Examiner*—Michael Roberts
(74) *Attorney, Agent, or Firm*—Oliff & Berridge, PLC

(57) ABSTRACT

An electrophoretic device includes barrier walls that contact a first and second substrate to form a plurality of cubicles (spaces) arranged in a matrix shape for containing an electrophoretic dispersion liquid. A series of cubicles communicate with each other through an opening to contain the same color electrophoretic dispersion liquid. Adjacent series of cubicles can be filled with an electrophoretic dispersion liquid having a different color. Series of cubicles for containing the same color electrophoretic dispersion liquid may be formed in a staggered, diagonal, or honeycomb shape.

20 Claims, 7 Drawing Sheets

ELECTROPHORETIC DEVICE, METHOD OF MANUFACTURING THE SAME, AND ELECTRONIC APPARATUS

BACKGROUND

1. Technical Field

The present invention relates to electrophoretic devices that utilize electrophoresis for forming image, the electrophoresis in which the charged particles in a medium will move by applying voltages.

2. Related art

In an electrophoretic device, a dispersion liquid used for a electrophoretic display is sealed in between two transparent electrode substrates having an ITO film (a tin doped indium oxide film) formed on the surface of a glass, for example. The dispersion liquid used for the electrophoretic display contains electrophoretic particles with one or a plurality of types of color tones, and an electrophoretic dispersion media. By applying voltages to between two electrodes, the electrophoretic particles will move in the electrophoretic disperse medium and the existing position thereof will change thereby to display information. Such an example of the electrophoretic display device has been disclosed in the relate art.

JP-A-2003-295235 is an example of related art.

However, it is difficult to arrange electrophoretic particles of a specific color tone accurately on a desired drive electrode. Moreover, in the case where the electrophoretic particles are arranged in the electrophoretic disperse medium, inclination of the electrophoretic particles may occur depending on the attitude of the electrophoretic display device.

In order to prevent this, for example, barrier walls are formed in a grid shape on a substrate, and for example, electrophoretic dispersion liquids corresponding to R (red), G (green), and B (blue) are filled into micro cells (cubicles), which are to be formed of the barrier walls. Moreover, for example, the dispersion liquid used for the electrophoretic display is enclosed in a microcapsule, and the microcapsule is applied onto the substrate.

However, with the former method it is difficult to fill each cell with the dispersion liquid of each color while avoiding the color mixing. Also with the latter method, it is difficult to apply the microcapsule to a desired position while classifying by color accurately.

SUMMARY

An advantage of the invention is to provide an electrophoretic display device which simplifies the arrangement and filling of the electrophoretic dispersion liquid that contains electrophoretic particles of a plurality of types of color tones, and to provide a method for manufacturing the same.

According to an aspect of the invention, the electrophoretic display device of the invention includes: a first substrate; a second substrate; a plurality of barrier walls formed in between the first substrate and the second substrate, wherein in between the first barrier wall and the second barrier wall among the plurality of barrier walls, at least one first space that isolates the first barrier wall from the second barrier wall is formed, and a liquid material that contains charged particles of at least one type is arranged in the first space. It is preferable that a second space that communicates with the first space be formed in between the first barrier wall and the second barrier wall, and that the dispersion liquid be arranged in the second space.

Moreover, according to another aspect of the invention, the electrophoretic display device includes: a first substrate; a second substrate; a barrier wall layer formed in between the first substrate and the second substrate, wherein a plurality of spaces surrounded by the barrier walls are formed in the barrier wall layer, and at least a first space and a second space among the plurality of spaces are communicating with each other, and a liquid material that contains charged particles of at least one type is arranged in the first space and the second space.

With such a structure, it is possible to introduce, along with the disperse medium, for example, colored particles (the electrophoretic particles having color tones which can be used for displaying white, black, green, red, blue, or the like) from one location of the first space to the relevant color pixel region, and the electrophoresis display device, in which the colored particles are introduced easily, can be obtained.

It is also preferable that in the first substrate a pixel electrode coupled to a transistor be formed, in the second substrate a counter electrode be formed, and the counter electrode generate an electric field between the counter electrode and the pixel electrode thereby to move the charged particles. With such a drive structure, the charged particles can move in the perpendicular direction relative to the screen of the electrophoretic display device.

It is also preferable that in the first substrate there be formed a pixel electrode coupled to a transistor, and a counter electrode that generates an electric field between the pixel electrode and the counter electrode thereby to move the charged particles. With such a drive structure, the charged particles can move in the horizontal direction relative to the screen of the electrophoretic display device.

It is preferable that in between the first substrate and the second substrate a plurality of spaces be arranged, the plurality of spaces being arranged in a matrix shape. Accordingly, a drive electrode group can be formed in a matrix shape, and the electrode drive for forming image becomes easy.

It is also preferable that in between the first substrate and the second substrate a third space be arranged, the first space do not communicate with the third space, and a liquid material arranged in the first space be different from a liquid material arranged in the third space. Accordingly, the colored particles having different color tones can be prevented from mixing, and the color electrophoretic display device can be obtained. Accordingly, a column (a color stripe) of color pixels having the same color tone can be formed easily.

It is preferable that the charged particles contained in the liquid material arranged in the first space differ in color from the charged particles contained in the liquid material arranged in the third space. Accordingly, the color electrophoretic display device can be obtained by means of the colored particles having different color tones.

It is preferable that a solvent contained in the liquid material arranged in the first space differ in color from a solvent contained in the liquid material arranged in the third space. Accordingly, it is possible to obtain a color electrophoretic display device by means of the solvent having different color tones.

It is preferable that the barrier wall is constituted of photoresist. By using photoresist it is possible to form a plurality of micro spaces easily.

According to another aspect of the invention, the electronic apparatus uses the electrophoretic display device with the above-described configuration as an information display section. Here, the electronic apparatus is a product provided with an embodiment to be transferred through, for example, commercial transaction, and it includes, for example, video cameras, televisions, large-sized screens, cellular phones, personal computers, portable type information apparatus (the so-called PDAs), and various kinds of other apparatus.

According to another aspect of the invention, the method for manufacturing an electrophoretic display device includes the steps of: film-forming photoresist on a first substrate; patterning the photoresist to form a barrier wall layer having a plurality of rows of a plurality of communicating spaces; bonding the first substrate to the second substrate through the barrier wall layer therebetween; and introducing a liquid material into a plurality of communicating spaces of the barrier wall layer, the liquid material containing the charged particles of at least one type.

With such a configuration, a liquid material can be introduced into each space communicating from one space. It is possible to obtain an electrophoretic display device having a plurality of rows of a plurality of communicating cubicles. For the introduction of the liquid material, for example, the introduction through a capillary phenomenon (a capillary action) under a decompressed atmosphere can be used.

According to another aspect of the invention, the method for manufacturing an electrophoretic display device includes the steps of film-forming photoresist on a first substrate, patterning the photoresist to form a barrier wall layer having a plurality of rows of a plurality of communicating spaces; introducing a liquid material into a plurality of communicating spaces of the barrier wall layer, the liquid material containing the charged particles of at least one type; and bonding the first substrate to a second substrate through the barrier wall layer therebetween.

Also with such a configuration, it is possible to obtain an electrophoretic display device having a plurality of rows of a plurality of communicating spaces into which the liquid material is introduced. Because the liquid material is introduced into the space of the barrier wall layer before bonding the first substrate to the second substrate, the introduction of the liquid material is easy. Moreover, once the liquid material is introduced into one space of the barrier wall layer, a column of the communicating spaces will be filled with the liquid material one after another. A syringe and a droplet-discharging (an ink jet) method can be used for the introduction.

It is preferable that colored particles having a color tone, which is assigned to a relevant column, for each column of the plurality of communicating spaces be introduced. This enables each column to be colorized, and an electrophoretic display device used for color display can be constituted.

BRIEF DESCRIPTION OF THE DRAWINGS

The invention will be described with reference to the accompanying drawings, wherein like numbers refer to like elements.

DESCRIPTION OF THE EMBODIMENTS

Hereafter, the embodiments of the invention will be described with reference to accompanying drawings.

Embodiment 1

Figure 1:
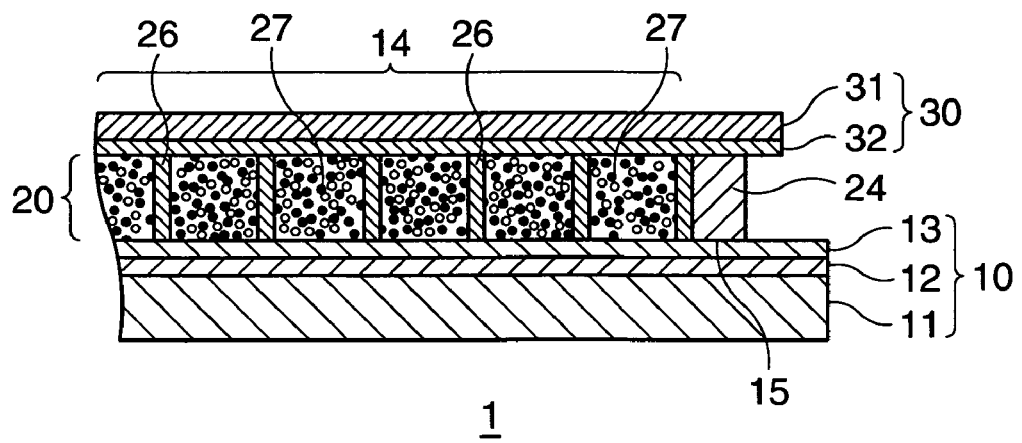
FIG. 1 is a sectional view of an electrophoretic display device showing a first embodiment of the invention.

A first embodiment of the electrophoretic display device of the embodiments of the invention is shown in FIG. 1. As shown in this view, an electrophoretic display device 1 is constituted of a flexible semiconductor circuit substrate 10, an electrophoretic display layer 20, and a flexible transparent electrode substrate 30, if roughly divided.

In this embodiment, the electrophoretic display layer 20 arranged in between the semiconductor circuit substrate 10 and transparent electrode substrate 30 is divided into a plurality of cubicles (spaces) arranged in a matrix shape by a barrier wall 26. Then, as described later, the cubicles in which the electrophoretic particles having the same color tone are to be arranged in one direction are formed as to communicate to each other. The color tones of the electrophoretic particles may be cyanogen, magenta, yellow, etc., other than white, black, red (R), green (G), blue (B), etc. The color tone may be a colored one other than the color of the material itself of the electrophoretic particles. Other than this, the color tones may be made by the color of the disperse medium (solvent) that disperses the electrophoretic particles.

The semiconductor circuit substrate 10 includes a flexible substrate 11 as an insulative base substrate in which a circuit is to be formed, and a thin film semiconductor circuit layer 13. The flexible substrate 11 is, for example, a polycarbonate substrate of 200 μm in film thicknesses. On top of this flexible substrate 11 the semiconductor circuit layer 13 is deposited (bonded) through a UV (ultraviolet rays) hardening-type adhesive 12. In case of forming a thin film semiconductor circuit on such a flexible substrate (a resin substrate), a transfer technique (hereinafter, referred to as the "thin film circuit transferring method") of the thin film circuit, in which a thin film semiconductor circuit is formed on a heat-resistant substrate (a glass substrate) and this thin film semiconductor circuit is transferred totally or partially onto the resin substrate, can be used.

JP-A-10-125931, JP-A-11-26733, JP-A-2004-327836, or the like are examples of related art.

In addition, the substrate 11 may be a glass substrate if the electrophoretic display device 1 does not need flexibility.

In the semiconductor circuit layer 13, there are formed a wiring group, a pixel electrode (a drive electrode) group, a pixel driver circuit, or the like, which are arranged plurally in the line direction and in the column direction, respectively (not shown). TFTs (thin film transistors) are used for the driver circuit. Moreover, in the semiconductor circuit substrate 10, a row decoder and a column decoder, or the like for choosing the drive pixel are also formed (not shown).

The pixel electrode group arranged in a matrix shape forms a display-area section 14 for displaying an image (two-dimensional information). Moreover, in the periphery of the semiconductor circuit layer 13, a coupling electrode 15 used for connection with a transparent electrode 32 of a transparent electrode substrate 30 is formed. It is desirable that the film thickness of the semiconductor circuit substrate 10 be, for example, 25 µm or more from the point of the physical strength of the substrate at the time of forming the thin film circuit, and it is desirable that it be 200 µm or less from the point of securing the flexibility of the substrate.

The electrophoretic display layer 20 is arranged in between the semiconductor circuit substrate 10 and the transparent electrode substrate 30. The electrophoretic display layer 20 is constituted of a barrier wall (or a partition) layer 26 and an electrophoretic dispersion liquid 27. The electrophoretic display layer 20 is finely defined in a grid shape by the barrier wall layer 26, and each defined region (a cubicle) is filled with the electrophoretic dispersion liquid (a liquid material) 27. The electrophoretic dispersion liquid 27 includes a number of electrophoretic particles in the electrophoretic disperse medium. The electrophoretic particle has the characteristic that it moves in the electrophoretic disperse medium in response to applied voltages, and the electrophoretic particles of one type (one color) or more are used. The film thickness of the electrophoretic display layer 20 is 50 through 75 µm. The barrier wall layer 26 prevents the electrophoretic particles from inclining toward a part of the display area. In the embodiment, the barrier wall 26 is formed of photoresist, for example.

Figure 2:
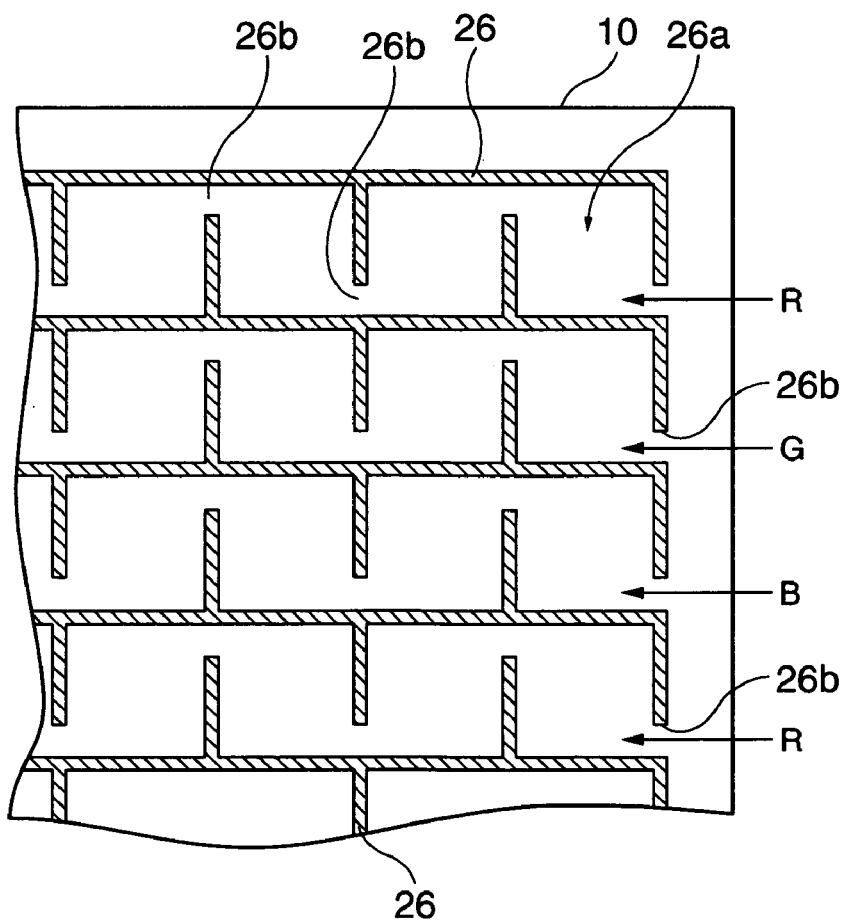
FIG. 2 is a plane view explaining an example of a pattern of the barrier wall layer of the first embodiment.
Figure 3:
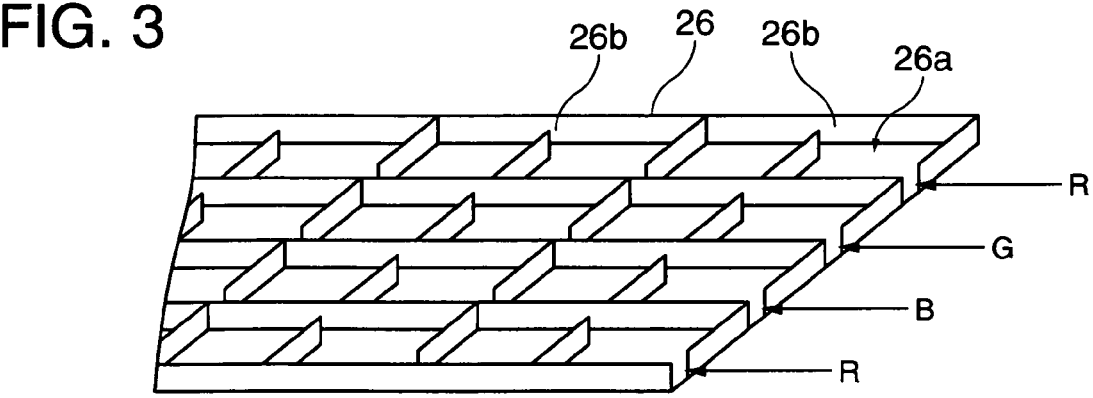
FIG. 3 is a perspective view explaining the example of the pattern of the barrier wall layer of the first embodiment.

FIG. 2 and FIG. 3 are explanatory views explaining the configuration of the barrier wall layer 26, and FIG. 2 is a plane view of the barrier wall layer 26 portion, and FIG. 3 is a perspective view of the barrier wall 26 portion.

As shown in both views, the barrier wall layer 26 is formed in a grid shape, and a number of cubicles 26a are arranged in a matrix shape in between the semiconductor substrate 10 and the transparent substrates 30. The cubicles adjoining to each other in one direction (for example, in the longitudinal direction, in the vertical direction, in the diagonal direction, or the like) communicate at an entrance portion 26b provided in the barrier wall layer 26. Although each cubicle 26a is filled with the electrophoretic dispersion liquid 27, it is preferable that the entrance portion 26b that communicates between the cubicles be provided as to prevent the electrophoretic dispersion liquid 27 from moving. In the illustrated example, the arrangement of the entrance portion 26b is in the form of a "zigzag arrangement" in which the entrance portion 26b shifts alternately in the direction perpendicular to the extending direction of the communicating pixel column.

Although the entrance portion 26b of the cubicle 26a is opened in the periphery portion of the barrier wall layer 26, this entrance portion 26b will be blocked off with adhesive, sealant, or the like after filling the electrophoretic dispersion liquid 27 from here.

In addition, in place of the electrophoretic dispersion liquid 27, a microcapsule containing an electrophoretic disperse medium and electrophoretic particles therein may be filled into the cubicle 26a.

The top of the electrophoretic display layer 20 and barrier wall layer 26 described above is covered with the transparent electrode substrate 30. The transparent electrode substrate 30 is constituted of a thin film (a transparent insulative synthetic-resin base material) 31 having a transparent electrode 32 formed on the bottom. The thin film 31 has a role to seal and protect the electrophoretic display layer 20. For example, the thin film to be the base of the transparent electrode substrate 30 is a polyethylene terephthalate (PET) film, and, for example, the film thickness of the transparent electrode substrate 30 is 100 µm.

The transparent electrode layer 32 is a tin doped indium oxide film (an ITO film). The transparent electrode layer 32 is coupled with the coupling electrode 15 of the semiconductor circuit layer 13 through an electric conductive material 24 in the periphery portion of the thin film 31. For example, a carbon paste that contains carbon particulates and a bonding material is used as the electric conductive material 24.

Comparison Example

Figure 9:
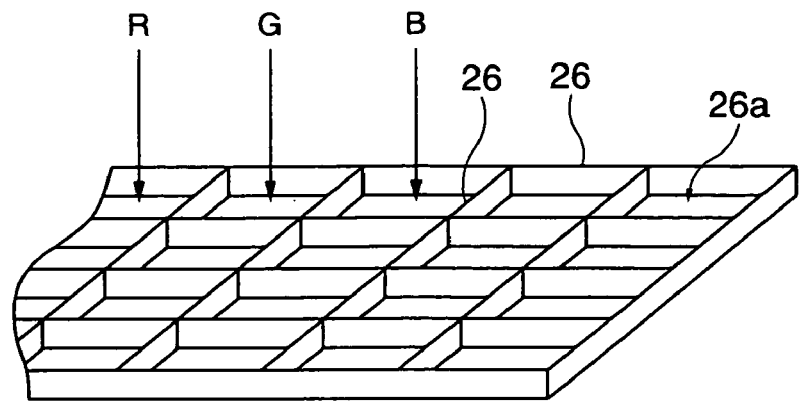
FIG. 9 is a perspective view explaining an example of a pattern of the barrier wall layer of a comparison example.

FIG. 9 shows a comparison example relative to the embodiment described above. In this view, like numbers are given to elements corresponding to FIG. 3, and the description thereof will be omitted.

In the case where the barrier wall layer 26 is made in a grid shape having no communicating openings like the comparison example, the electrophoretic dispersion liquid 27 needs to be introduced into each independent cubicle 26a in each cell while classifying respective colors of, for example, R, G, and B. Consequently, the problem that the electrophoretic dispersion liquids 27 having different colors mix or the like may arise. Moreover, it takes time to introduce the electrophoretic dispersion liquid medium 27, so the manufacturing efficiency is bad.

On the other hand, as shown in FIG. 3, with the configuration of the embodiment of the invention, because the cubicles 26a of the same color (color tone) are communicating through the entrance portion 26b, the electrophoretic dispersion liquid 27 can be introduced into a series of cubicles 26a from one location for each column.

For example, after bonding the semiconductor substrate 10 to the transparent electrode layer 30 through the barrier wall layer 26, the electrophoretic dispersion liquid 27 can be supplied from the entrance at the side face of the barrier wall layer 26 through the immersion and the capillary phenomenon.

Moreover, before bonding the semiconductor substrate 10 to the transparent electrode layer 30, the electrophoretic dispersion liquid 27 can be supplied from above the barrier wall layer 26 with a syringe or a droplet-discharging method (an ink-jet method). In this case, even if the supply position shifted to the adjoining cubicle, it is the region of the same color and therefore no problems will occur.

In addition, in case of supplying the electrophoretic dispersion liquid 27 from above, the entrance at the side face of the barrier wall layer 26 is closed. Moreover, the electrophoretic dispersion liquid 27 may include a microcapsule containing the electrophoretic particles and disperse medium.

Embodiment 2

Figure 6:
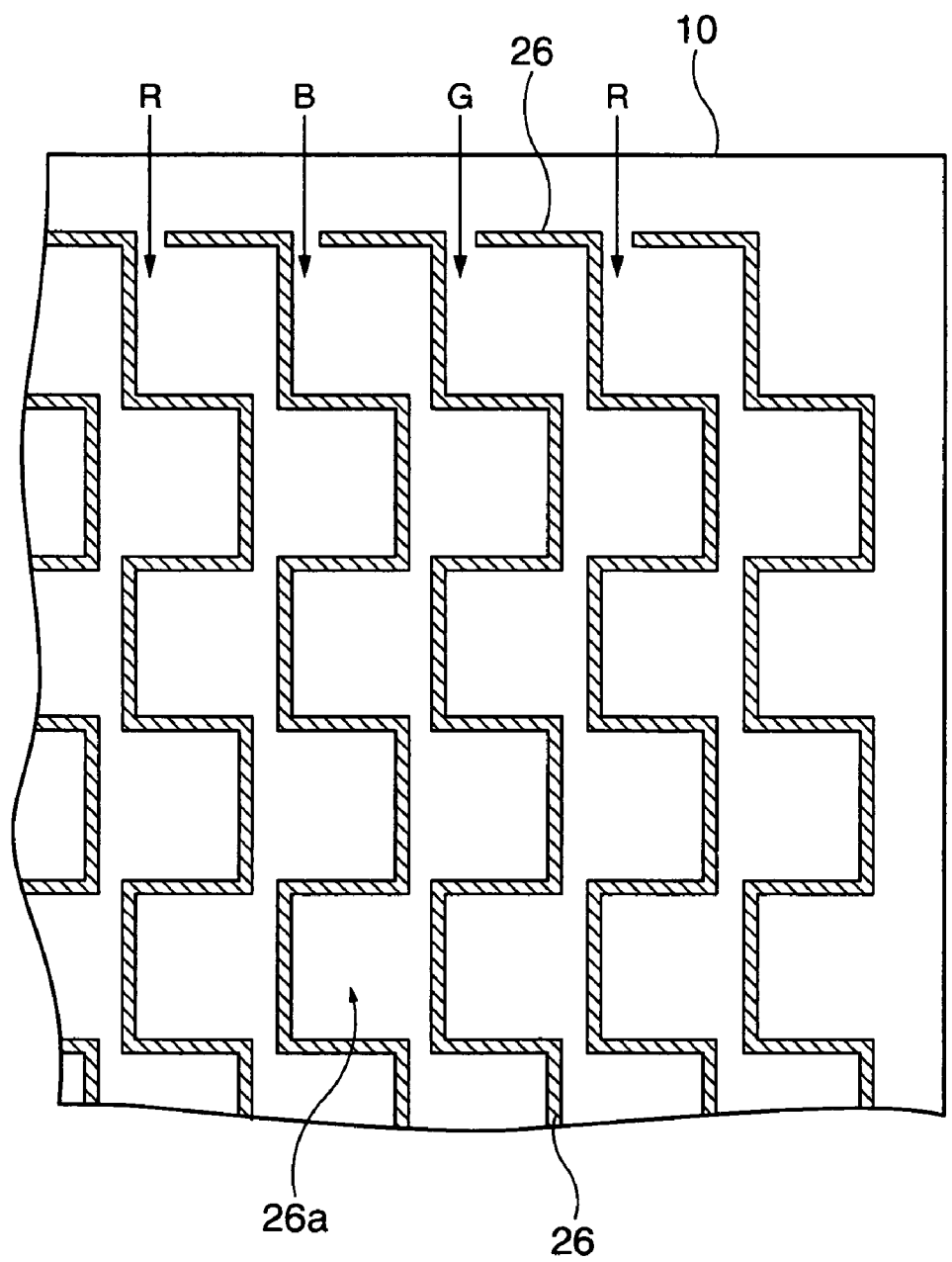
FIG. 6 is a plane view explaining an example of a pattern of the barrier wall layer of another embodiment.

FIG. 6 shows another configuration example of the barrier wall layer 26. In this embodiment, the pixels of R, G, and B can be arranged alternately on the same column. For this reason, among a plurality of cubicles 26a arranged in a matrix shape, the ones, into which the electrophoretic dispersion liquid 27 of the same color (color tone) is to be introduced, are arranged in a staggered (zigzag) shape, so that the adjoining cubicles 26a communicate with each other.

Embodiment 3

Figure 7:
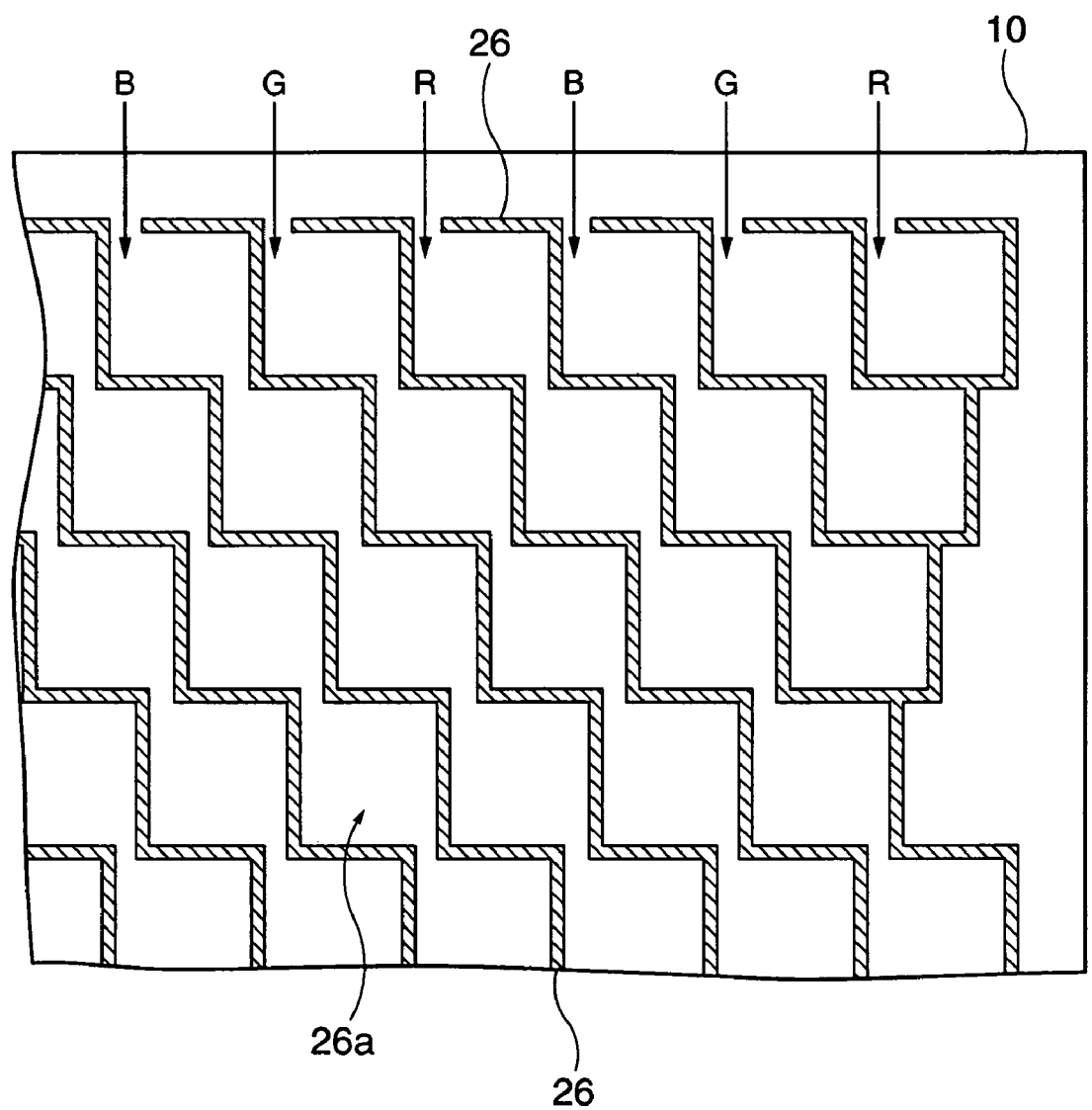
FIG. 7 is a plane view explaining an example of a pattern of the barrier wall layer of another embodiment.

FIG. 7 further shows another configuration example of the barrier wall layer 26. In this embodiment, the pixels of R, G, and B can be arranged alternately on the same column. For this reason, among a plurality of cubicles 26a arranged in a matrix shape, the ones, into which the electrophoretic dispersion liquid 27 of the same color (color tone) is to be introduced, are arranged diagonally, so that the adjoining cubicles 26a communicate with each other.

Embodiment 4

Figure 8A:
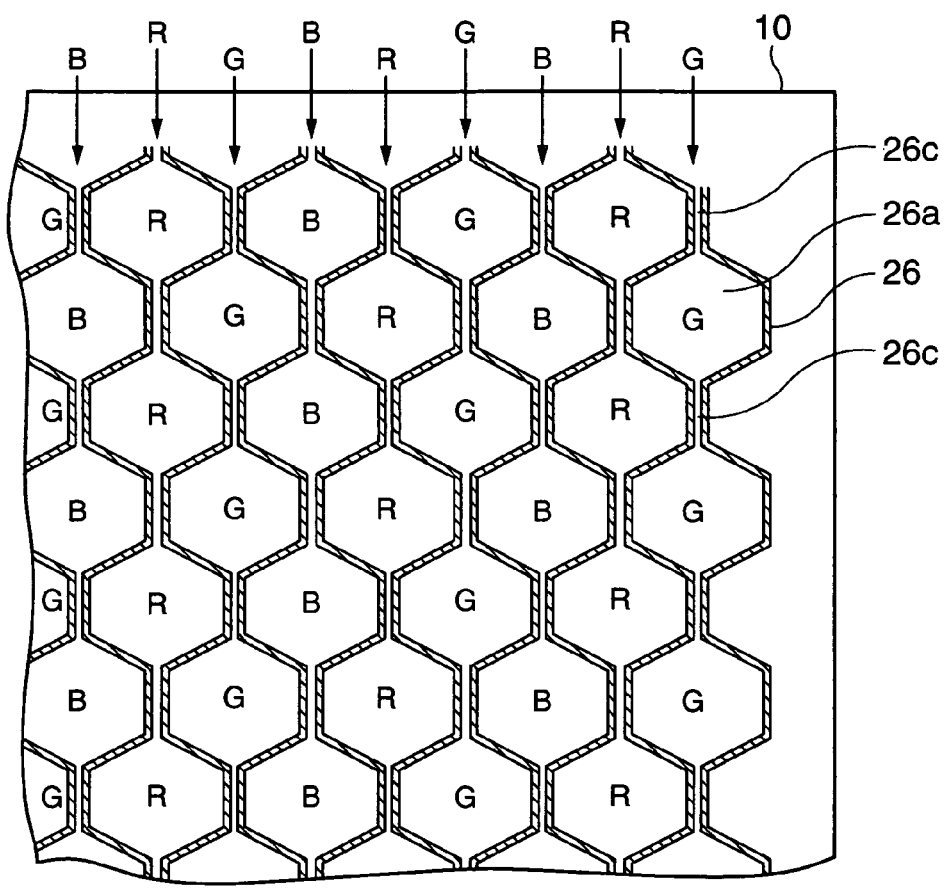
FIG. 8 is a plane view explaining an example of a pattern of the barrier wall layer of another embodiment.
Figure 8B:
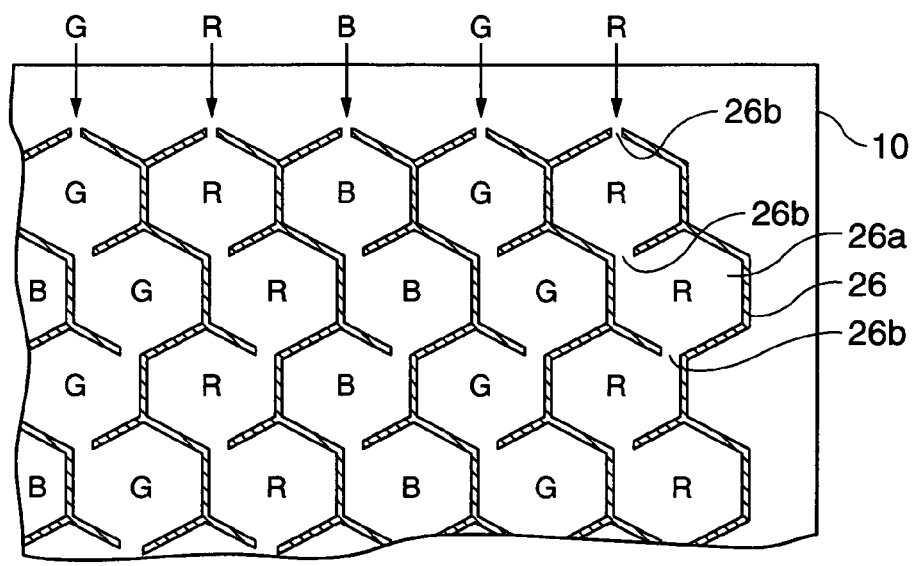

FIG. 8A and FIG. 8B further show other configuration examples of the barrier wall layer 26. In these embodiments, a plurality of cubicles 26a are defined and arranged by the barrier wall 26 having a robust honeycomb structure, and the pixels of R, G, and B can be arranged alternately in a certain direction. Moreover, the ones, into which the electrophoretic dispersion liquid 27 of the same color (color tone) is to be introduced, are arranged in a row, so that the adjoining cubicles 26a communicate with each other through a communicating passage 26c (in FIG. 8A) or through the entrance 26b (in FIG. 8B). The configuration of FIG. 8A has an advantage in that it is possible to constitute so that the adjoining 3 pixels become the pixels of R, G, and B in any place.

Manufacturing Method 1

Next, the method for manufacturing the above-described electrophoretic display device will be described with reference to FIG. 4. In this view, like numbers are given to elements corresponding to FIG. 1.

Figure 4A:
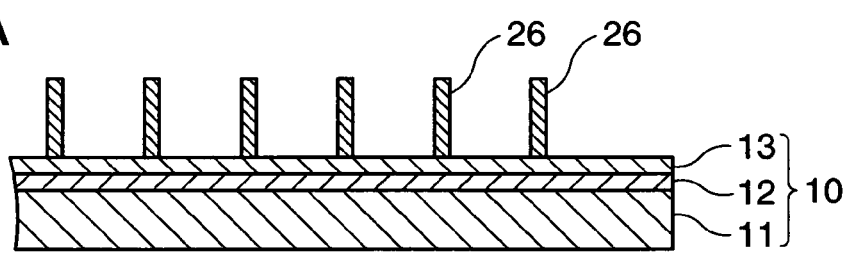
FIG. 4 is a process chart explaining the manufacturing process of the first embodiment.

As shown in FIG. 4A, with the already-described thin film circuit transferring method, the thin film semiconductor circuit layer 13 separately formed on the glass substrate is transferred onto the polycarbonate film 11 thereby to produce the thin film semiconductor circuit substrate 10.

Next, photoresist is applied onto the semiconductor circuit layer 13 and exposed with a room pattern of the barrier wall layer 26, and then it is developed to form the barrier wall layer 26 (refer to FIG. 2 and FIG. 3). In addition, the barrier wall layer 26 with a grid shape may be formed of polymide or the like with an offset printing or the like.

Figure 4B:
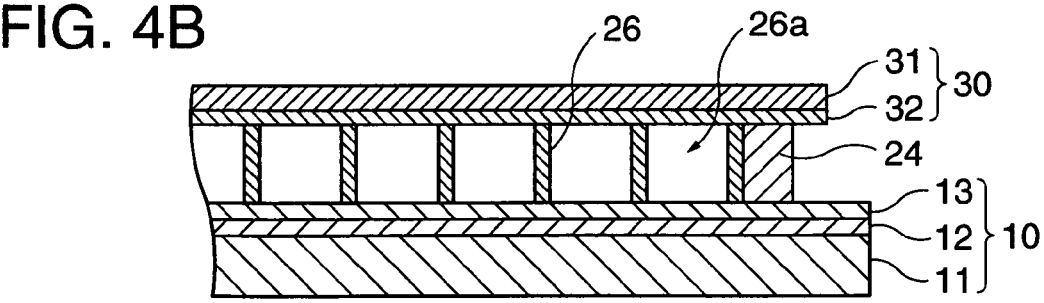

Next, as shown in FIG. 4B, the carbon paste 24, which is a coupling member, is arranged on the electrode 15 by means of a dispenser. The PET film 30 with ITO (having an adhesive layer on the ITO side), which is the transparent electrode substrate, is arranged opposing to the semiconductor circuit substrate 10, and the alignment is carried out. By laminating with the use of a vacuum laminator (not shown), for example, under an atmosphere at temperature of 90° C. and at atmospheric pressure of 0.8 MPa, the thin film semiconductor circuit substrate 10 and the transparent electrode substrate 30 are bonded together through the barrier wall layer 26 therebetween, thereby assembling the electrophoretic display device 1.

Figure 4C:
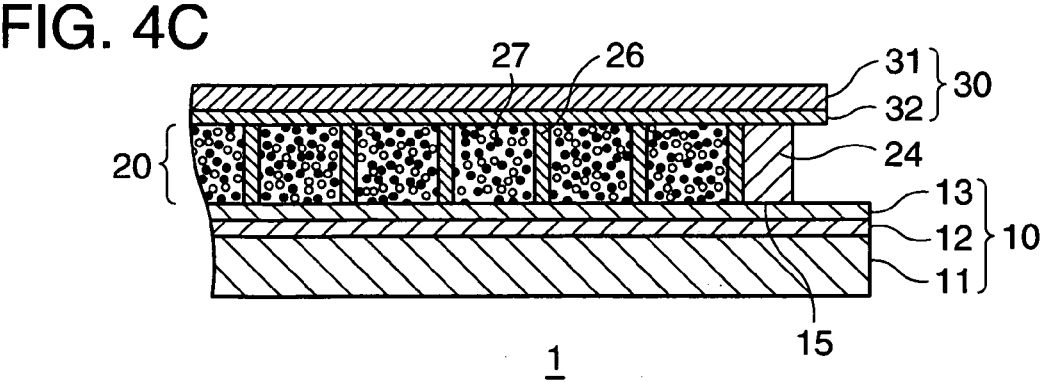

Next, as shown in FIG. 4C, the electrophoretic display device 1 is filled with the electrophoretic dispersion liquid (the disperse medium and electrophoretic particles) 27.

For example, as shown in FIG. 2 and FIG. 3, the entrances of the ones other than the pixel region of R (red) among a plurality of entrance portions 26b opened on the side face of the barrier wall layer 26 are closed with a tape or the like, and then the electrophoretic display device 1 is immersed in the electrophoretic dispersion liquid that contains red electrophoretic particles, so that the red electrophoretic particles are introduced into the electrophoretic display device 1 through a capillary phenomenon. The entrance of the pixel region of R (red) is blocked off with a sealing member such as adhesive.

Next, the tape of the entrance of the pixel region of G (green) is removed, and then the electrophoretic display device 1 is immersed in the electrophoretic dispersion liquid that contains green electrophoretic particles, so that the green electrophoretic particles are introduced into the electrophoretic display device 1 through a capillary phenomenon. The entrance of the pixel region of G is blocked off with a sealing member such as adhesive.

Next, the tape of the entrance of the pixel region of B (blue) is removed, and then the electrophoretic display device 1 is immersed in the electrophoretic dispersion liquid that contains blue electrophoretic particles, so that the blue electrophoretic particles are introduced into the electrophoretic display device 1 through a capillary phenomenon. The entrance of the pixel region of B is blocked off with a sealing member such as adhesive.

In this way, the electrophoretic dispersion liquids of a plurality of types of color tones are introduced in the electrophoretic display device 1, thereby completing the assembly of the electrophoretic display device 1.

Manufacturing Method 2

FIG. 5 is an explanatory view explaining an example of another method for manufacturing the electrophoretic display device. In this view, like numbers are given to like elements corresponding to FIG. 4.

In this embodiment, the electrophoretic dispersion liquid 27 is supplied from above the barrier wall layer 26.

Figure 5A:
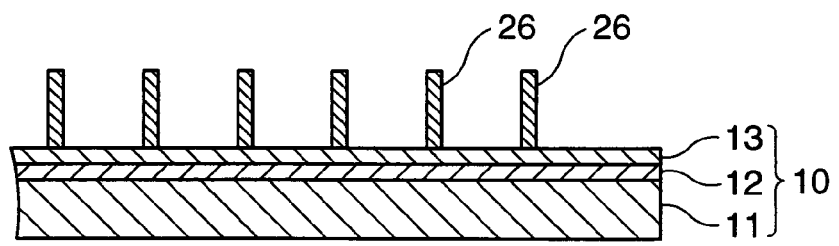
FIG. 5 is a process chart explaining another manufacturing processes of the first embodiment.

As shown in FIG. 5A, with the already-described thin film circuit transferring method, the thin film semiconductor circuit layer 13 separately formed on the glass substrate is transferred onto the polycarbonate film 11, thereby producing the thin film semiconductor circuit substrate 10.

Next, photoresist is applied onto the semiconductor circuit layer 13 and exposed in a room pattern of the barrier wall layer 26, and then it is developed to form the barrier wall layer 26. In addition, the barrier wall layer 26 with a grid shape may be formed of polymide or the like with an offset printing or the like.

Figure 5B:
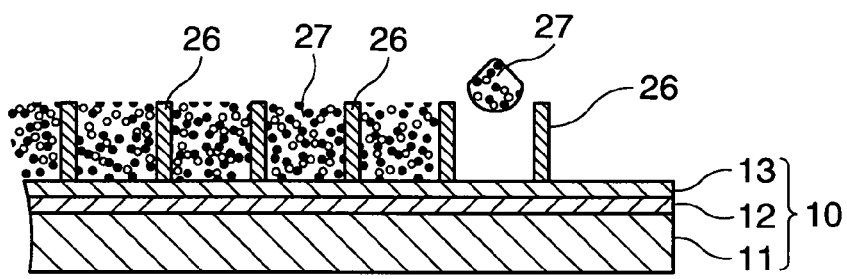

Next, as shown in FIG. 5B, the electrophoretic dispersion liquid 27 is injected with a droplet-discharging method (an ink-jet method). At this time, for example, colorization is carried out by injecting three colors separately for each of the pixel columns of R (red), G (green), and B (blue).

Figure 5C:
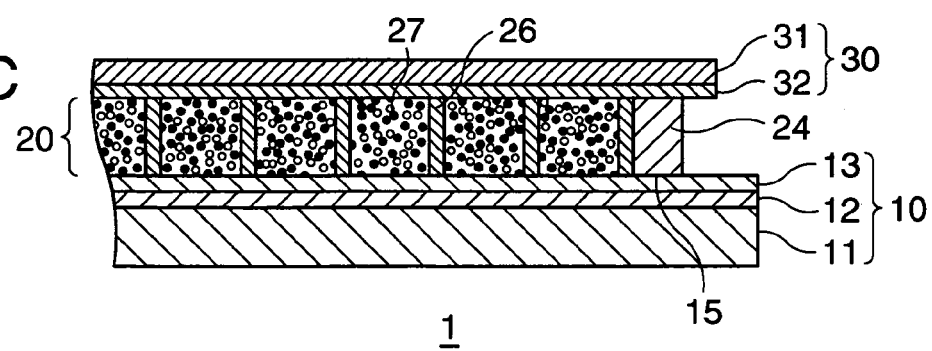

Next, as shown in FIG. 5C, the carbon paste 24, which is a coupling member, is arranged on the electrode 15 by means of a dispenser. The PET film 30 with ITO (having an adhesive layer on the ITO side), which is the transparent electrode substrate, is arranged opposing to the semiconductor circuit substrate 10, and the alignment is made. By laminating with the use of a vacuum laminator (not shown), for example, under an atmosphere at temperature of 90° C. and at atmospheric pressure of 0.8 MPa, the thin film semiconductor circuit substrate 10 and the transparent electrode substrate 30 are bonded together through the barrier wall layer 26 therebetween, thereby assembling the electrophoretic display device 1.

In this way, the electrophoretic dispersion liquids of a plurality of types of color tones are introduced into the electrophoretic display device 1, thereby completing the assembly of the electrophoretic display device 1.

Electronic Apparatus

Figure 10:
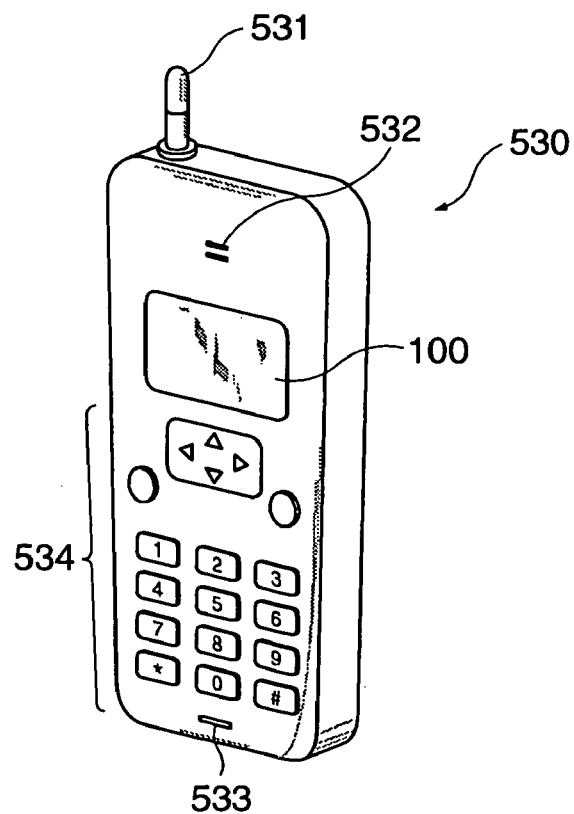
FIG. 10 is an explanatory view explaining an example of electronic apparatus in which the electrophoretic display device of the invention is used in a display section.

The electrophoretic display device of the invention is applicable to the display sections of various kinds of electronic apparatus. FIG. 10 shows an example of an electronic apparatus in which the electrophoretic display device is used for the display section.

This view is an application example to a cellular phone, and a cellular phone 530 is provided with an antenna section 531, a voice output section 532, a voice input section 533, an operation section 534, and an electrophoretic display device 100 of the invention. Thus, the electrophoretic display device 100 of the invention can be utilized as the display section of the cellular phone 530.

The electrophoretic display device of the invention is applicable to various kinds of electronic apparatus that carries out image display and character display, and not to limited to the above-described examples. For example, it can be utilized for electronic papers, PDAs, electronic notebooks, video billboards, public relation displays, or the like. Moreover, it can be also applicable to the apparatus belonging to real estate, such as a wall surface configured as to be able to apply electric fields, and applicable to the apparatus belonging to movable bodies, such as vehicles, flying bodies, and ships, or the like, other than the examples of the apparatus described above.

Other Modification

Moreover, there is no limitation also to the drive structure of the display device. For example, in the above-described embodiment, it is the so-called vertical-displacement type electrophoretic device in which the charged particles are moved in the perpendicular direction by applying an electric field in the direction perpendicular to the screen, thereby changing the color tone to display the image, however, it is also applicable to the so-called horizontal-displacement type electrophoretic device in which the charged particles are moved in the horizontal direction with the use of the electric field which changes in the horizontal (parallel) direction relative to the screen, thereby changing the color tone to display the image.

What is claimed is:

1. An electrophoretic device, comprising:
   a first layer;
   a second layer;
   a first barrier wall having a first part and a second part, each of the first and second parts contacts both the first layer and the second layer;
   a second barrier wall that contacts the first layer and the second layer; and
   a liquid material that is located at a plurality of cubicles between the first and second barrier walls, an opening being formed between two of the plurality of cubicles, one of the plurality of cubicles being defined at least by the first part of the first barrier wall, the second part of the first barrier wall, and the second barrier wall, a distance between the first part of the first barrier wall and the second barrier wall being larger than a distance between the second part of the first barrier wall and the second barrier wall, the opening being formed between the second part of the first barrier wall and the second barrier wall.

2. The electrophoretic device according to claim 1, one end of the plurality of cubicles having an entrance portion, the entrance portion being sealed with a sealing member.

3. The electrophoretic device according to claim 1, the liquid material including a plurality of charged particles.

4. The electrophoretic device according to claim 1, each of the plurality of cubicles having a honeycomb structure.

5. The electrophoretic device according to claim 1, the one of the plurality of cubicles being defined by the first part of the first barrier wall, the second part of the first barrier wall, a first part of the second barrier wall, and a second part of the second barrier wall, a distance between the first part of the first barrier wall and the first part of the second barrier wall being larger than a distance between the second part of the first barrier wall and the second part of the second barrier wall, the opening being formed between the second part of the first barrier wall and the second part of the second barrier wall.

6. The electrophoretic device according to claim 1, the second part of the first barrier wall being a protruding portion that is protruding from the first barrier wall.

7. The electrophoretic device according to claim 1, further comprising:
   a first substrate on which the first layer is formed; and
   a second substrate that is formed on the second layer.

8. An electrophoretic device, comprising:
   a first layer;
   a second layer;
   a first barrier wall having a first part and a second part that each contacts the first layer and the second layer;
   a second barrier wall that contacts the first layer and the second layer;
   a third barrier wall that contacts the first layer and the second layer;
   a first liquid material that is located at a plurality of first cubicles between the first and second barrier walls, a first opening being formed between two of the plurality of first cubicles, one of the plurality of first cubicles being defined at least by the first part of the first barrier wall, the second part of the first barrier wall, and the second barrier wall, a distance between the first part of the first barrier wall and the second barrier wall being larger than a distance between the second part of the first barrier wall and the second barrier wall, the first opening being formed between the second part of the first barrier wall and the second barrier wall; and
   a second liquid material that is located at a plurality of second cubicles between the first and third barrier walls, a second opening being formed between two of the plurality of second cubicles, one of the plurality of second cubicles being defined at least by the first part of the first barrier wall, the second part of the first barrier wall, and the third barrier wall, a distance between the second part of the first barrier wall and the third barrier wall being larger than a distance between the first part of the first barrier wall and the third barrier wall, the second opening being formed between the first part of the first barrier wall and the third barrier wall.

9. The electrophoretic device according to claim 8, a color of the first liquid material being different from a color of the second liquid material.

10. The electrophoretic device according to claim 8, the first liquid material including a plurality of first particles, the second liquid material including a plurality of second particles, a color of each of the plurality of first particles and a color of each of the plurality of second particles being different.

11. The electrophoretic device according to claim 8, each of the plurality of first cubicles having a honeycomb structure.

12. An electrophoretic device, comprising:
a first layer;
a second layer;
a first barrier wall that contacts the first layer and the second layer;
a second barrier wall that contacts the first layer and the second layer;
a plurality of first protruding portions that is protruding from the first barrier wall, each of the first protruding portions contacting the first layer and the second layer; and
a first liquid material that is located at a plurality of first cubicles between the first and second barrier walls, a first opening being formed between two of the plurality of first cubicles, each of the plurality of first cubicles being defined at least by a part of the first barrier wall, a part of the second barrier wall that contacts the first layer and the second layer, and at least one of the plurality of first protruding portions, the opening being formed between the part of the second barrier wall and the one of the plurality of first protruding portions.

13. The electrophoretic device according to claim 12, each of the first protruding portions not contacting the second barrier wall.

14. The electrophoretic device according to claim 12, further comprising:
a plurality of first protruding portions that is protruding from the first barrier wall, each of the first protruding portions contacting the first layer and the second layer;
a plurality of second protruding portions that is protruding from the second barrier wall, each of the second protruding portions contacting the first layer and the second layer, each of the plurality of cubicles being defined by a part of the first barrier wall, a part of the second barrier wall, one of the plurality of first protruding portions, and one of the plurality of second protruding portions.

15. The electrophoretic device according to claim 12, further comprising:
a third barrier wall that contacts the first layer and the second layer; and
a second liquid material that is located at a plurality of second cubicles between the first and third barrier walls, a color of the first liquid material being different from a color of the second liquid material.

16. The electrophoretic device according to claim 12, further comprising:
a third barrier wall that contacts the first layer and the second layer; and
a second liquid material that is located at a plurality of second cubicles between the first and third barrier walls, the first liquid material including a plurality of first particles, the second liquid material including a plurality of second particles, a color of each of the plurality of first particles and a color of each of the plurality of second particles being different.

17. The electrophoretic device according to claim 12, each of the plurality of cubicles having a honeycomb structure.

18. An electronic apparatus including the electrophoretic device according to claim 1.

19. A method of manufacturing an electrophoretic device, comprising:
forming a photoresist over a first layer;
forming a first barrier wall, a second barrier wall, and a third barrier wall on the first layer, a plurality of first cubicles being defined between the first and second barrier walls, a first opening being formed between two of the plurality of first cubicles, one of the plurality of first cubicles being defined at least by a first part of the first barrier wall, a second part of the first barrier wall, and the second barrier wall, a distance between the first part of the first barrier wall and the second barrier wall being larger than a distance between the second part of the first barrier wall and the second barrier wall, the first opening being formed between the second part of the first barrier wall and the second barrier wall, one end of the plurality of first cubicles having a first entrance portion, a plurality of second cubicles being defined between the first and third barrier walls, a second opening being formed between two of the plurality of second cubicles, one of the plurality of second cubicles being defined at least by the first part of the first barrier wall, the second part of the first barrier wall, and the third barrier wall, a distance between the second part of the first barrier wall and the third barrier wall being larger than a distance between the first part of the first barrier wall and the third barrier wall, the second opening being formed between the first part of the first barrier wall and the third barrier wall, one end of the plurality of second cubicles having a second entrance portion;
forming a second layer on the first, second, and third barrier walls to contact all parts of the first, second, and third barrier walls;
introducing a first liquid material into the plurality of first cubicles from the first entrance portion; and
introducing a second liquid material into the plurality of second cubicles from the second entrance portion, a color of the first liquid material being different from a color of the second liquid material.

20. A method of manufacturing an electrophoretic device, comprising:
forming a photoresist over a first layer,
forming a first barrier wall, a second barrier wall, a third barrier wall, a plurality of first protruding portions that is protruding from the first barrier wall, and a plurality of second protruding portions, a plurality of first cubicles being defined between the first and second barrier walls, a first opening being formed between two of the plurality of first cubicles, one of the plurality of first cubicles being defined by a part of the first barrier wall, a part of the second barrier wall, one of the plurality of first protruding portions, and one of the plurality of second protruding portions, the first opening being formed between the part of the second barrier wall and the one of the plurality of first protruding portions, one end of the plurality of first cubicles having a first entrance portion, a plurality of second cubicles being defined between the first and third barrier walls, a second opening being formed between two of the plurality of second cubicles, one end of the plurality of second cubicles having a second entrance portion;
forming a second layer on the first barrier wall, the second barrier wall, the third barrier wall, the plurality of first protruding portions, and the plurality of second protruding portions to contact all parts of the first barrier wall, the second barrier wall, the third barrier wall, the plurality of first protruding portions, and the plurality of second protruding portions;

introducing a first liquid material into the plurality of first cubicles from the first entrance portion; and introducing a second liquid material into the plurality of second cubicles from the second entrance portion, a color of the first liquid material being different from a color of the second liquid material.

* * * * *